United States Patent
Rubinsztajn et al.

[11] Patent Number: 6,136,996
[45] Date of Patent: Oct. 24, 2000

[54] CATALYSTS FOR POLYCONDENSATION AND REDISTRIBUTION OF ORGANOSILOXANE POLYMERS

[75] Inventors: Slawomir Rubinsztajn, Schenectady, N.Y.; Patricia P. Anderson, Williamstown, Mass.; Dennis P. Thompson, Clifton Park, N.Y.

[73] Assignee: General Electric Company, Pittsfield, Mass.

[21] Appl. No.: 08/573,218

[22] Filed: Dec. 13, 1995

[51] Int. Cl.$^7$ ........................................ C07F 7/08
[52] U.S. Cl. .................. 556/453; 556/450; 528/21; 502/158; 502/167; 502/200
[58] Field of Search .................. 556/453, 450; 528/21; 502/158, 167, 200

[56] References Cited

U.S. PATENT DOCUMENTS

| | | |
|---|---|---|
| 2,830,967 | 4/1958 | Nitzsche et al. . |
| 3,186,967 | 6/1965 | Nitzsche et al. . |
| 3,839,388 | 10/1974 | Nitzsche et al. . |
| 4,725,643 | 2/1988 | Burkhardt . |
| 4,888,405 | 12/1989 | Gamon et al. . |
| 4,975,510 | 12/1990 | Wegehaupt et al. . |
| 5,008,229 | 4/1991 | Schuster et al. . |
| 5,380,902 | 1/1995 | Hager et al. ........................ 528/21 X |
| 5,403,909 | 4/1995 | Rubinsztajn . |
| 5,420,221 | 5/1995 | Razzano et al. ........................ 528/21 X |
| 5,457,220 | 10/1995 | Razzano ........................ 556/453 |
| 5,510,441 | 4/1996 | Razzano ........................ 528/21 X |
| 5,534,608 | 7/1996 | Thompson et al. ........................ 528/21 X |
| 5,883,215 | 3/1999 | Bischoff et al. ........................ 528/21 |

FOREIGN PATENT DOCUMENTS 2 252 969    8/1992    United Kingdom .

*Primary Examiner*—Paul F. Shaver
*Attorney, Agent, or Firm*—Kenneth S. Wheelock

[57] ABSTRACT

A mixture of a short chain linear phosphazene having the formula:

$$X_{3-p}(HO)_p P(NPX_2)_m NP(O)X_2,$$

where X is a halogen selected from the group consisting of F, Cl, Br, and I, and m is an integer ranging from 0 to 6 and p is 0 or 1; and a linear sifoxane having a viscosity ranging from 1 to 5,000 centistokes is a catalyst for the polymerization, condensation, or redistribution of siloxanes; the process of making the catalyst and the process of using the catalyst.

21 Claims, No Drawings

CATALYSTS FOR POLYCONDENSATION AND REDISTRIBUTION OF ORGANOSILOXANE POLYMERS

FIELD OF THE INVENTION

The present invention relates to the reaction products of short-chain linear phosphazene compounds with organosiloxanes. Mixtures of these compounds are active catalysts for the polycondensation and redistribution of organosiloxane polymers.

BACKGROUND OF THE INVENTION

The polycondensation or polymerization of low molecular weight siloxanol oils has been practiced for several years. A wide range of catalysts have been used to perform these processes with a reasonable reaction time and temperature. Catalysts that may be used include, among others, sulfric acid, trifluorosulfonic acid, some Lewis acids, sodium or potassium hydroxide, tetrabutylphosphonium silanolate and some amines. A number of U.S. Patents disclose the use of phosphonitrilic compounds for the polycondensation and redistribution of low viscosity siloxane oligomers or polymers. In particular, U.S. Pat. Nos. 2,830,967; 3,186,967; 3,839,388; and 4,725,643. U.S. Pat. No. 4,975,510 discloses linear phosphonitrilic chlorides represented by the formula:

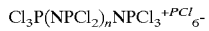

where n is an integer of from 1 to 6 are effective as catalysts for the polycondensation and equilibration of the low viscosity siloxane polymers. These catalysts have been shown to be especially effective for the production of siloxane fluids having a low content of terminal silanol groups. More recently U.S. Pat. Nos. 4,888,405 and 5,008,229 have disclosed new catalytic compositions containing phosphonitrilic chlorides and/or reaction products of these phosphonitrilic chlorides with organopolysiloxanes and/or organosilanes. A recent British Patent, 2,252,969 describes catalyst compounds having the general formula:

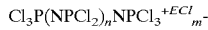

where E is an element having an electronegativity value of from 1.2 to 2 such as Al, Sb, P, Sn, Zn and Fe. U.S. Pat. No. 5,403,909 discloses phosphonitrilic compounds of the formula:

where b is an integer ranging from 0 to 8, a is 0 or 1, c is 0 or 1, X is a halogen selected from the group consisting of fluorine, chlorine, bromine, and iodine, Y is selected from the group consisting of OH, OR' and R'CO$_2$ where R' is alkyl or aryl; or

where b is an integer ranging from 0 to 8, a is 0 or 1, c is 0 or 1, X is a halogen selected from the group consisting of fluorine, chlorine, bromine, and iodine, Y is selected from the group consisting of OH, OR' and R'CO$_2$ where R' is alkyl or aryl as catalysts for the polycondensation and redistribution of siloxane polymers.

In spite of the foregoing developments, there is a continuing search for catalysts that are soluble in siloxanes, low in halogen content and active for the polymerization of organosiloxanes. It is known that the application of standard linear phosphonitrilic chlorides (LPNC's) as catalysts for polycondensation of low molecular siloxanediols can produce a high molecular gum which does not contain cyclic oligomeric siloxanes and that the gum can be prepared in a short cycle time. It is also known that a mixture of high molecular weight organopolysiloxanes and low molecular weight siloxanes can be redistributed into linear polymers without formation of a significant amount of cyclic species.

SUMMARY OF THE INVENTION

The present invention provides for a reaction mixture of linear siloxane polymers with short chain linear phosphazenes having the formula:

where X is a halogen selected from the group consisting of F, Cl, Br, and I, and m is an integer ranging from 0 to 6 and p is 0 or 1 that is useful as a catalyst for the condensation or polymerization of organosiloxanes.

Thus the present invention provides for a catalytic composition comprising:

1) a short chain linear phosphazene having the formula:

where X is a halogen selected from the group consisting of F, Cl, Br, and I, and m is an integer ranging from 0 to 6 and p is 0 or 1; and
2) a linear siloxane having a viscosity ranging from 1 to 5,000 centistokes.

The present invention also provides for a catalytic composition comprising the reaction product of:

1) a short chain linear phosphazene having the formula:

where X is a halogen selected from the group consisting of F, Cl, Br, and I, and m is an integer ranging from 0 to 6 and p is 0 or 1; and
2) a linear siloxane having a viscosity ranging from 1 to 5,000 centistokes.

The present invention further provides a process for making a catalytic mixture comprising:

1) preparing a short chain linear phosphazene compound having the formula:

where X is a halogen selected from the group consisting of F, Cl, Br, and I, and m is an integer ranging from 0 to 6 and p is 0 or 1; and
2) contacting said short chain linear phosphazene with a linear siloxane having a viscosity ranging from 1 to 5,000 centistokes.

The present invention also further provides a process wherein a catalytic mixture comprising:

1) a short chain linear phosphazene having the formula:

where X is a halogen selected from the group consisting of F, Cl, Br, and I, and m is an integer ranging from 0 to 6 and p is 0 or 1; and 2) a first linear siloxane having a viscosity ranging from 1 to 5,000 centistokes or the reaction product thereof;

(A) contacting said catalytic mixture with a second siloxane having the formula:

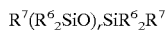
$$R^7(R^6{}_2SiO)_rSiR^6{}_2R^7$$

wherein $R^6$ is selected from the group consisting of hydrogen and 1 to 18 carbon atom hydrocarbon radicals and $R^7$ is selected from the group consisting of $R^6$, alkoxy, aryloxy and hydroxyl at a temperature ranging from about 0 to about 160° C. under a pressure ranging from about 1 to about 760 mm Hg and (B) deactivating said catalytic mixture by
1) heating to a temperature above 170° C.;
2) neutralizing said catalytic mixture with basic nitrogen compounds selected from the group consisting of ammonia, amines and organosilazanes;
3) neutralizing said catalytic mixture with a metal oxide, a metal hydroxide or a metal carbonate selected from the group consisting of lithium, sodium, magnesium, calcium, barium, zinc and aluminum; or
4) neutralizing said catalytic mixture with a compound selected from the group consisting of butyl lithium, bis (trimethylsilyl)amide and mixtures thereof; whereby said second siloxane is polymerized, condensed or redistributed.

The present invention includes, among its preferred features, the synthesis of a new catalytic composition, with a low content of halide, preferably chloride, which comprises products of reaction of short chain linear phosphazenes of formula $X_3P(NPX_2)_mNPX_2(O)$ where the m values can vary from 0 to 6 (note in this case p=0), with linear siloxanes of the formula $R(CH_3)_2Si(OSi(CH_3)_2)_kOSi(CH_3)_2R$ where k varies from 0 to 500 and where R is selected from the group consisting of H, $CH_3$, $CH=CH_2$, one to 40 carbon alkyl groups, and six to forty carbon atom aryl groups or linear siloxanes defined by the formula:

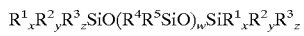
$$R^1{}_xR^2{}_yR^3{}_zSiO(R^4R^5SiO)_wSiR^1{}_xR^2{}_yR^3{}_z$$

where $R^1$, $R^2$, $R^3$, $R^4$, and $R^5$ are each independently selected from the group consisting of hydrogen and one to forty carbon atom monovalent hydrocarbon radicals, the subscripts x, y, and z are numbers ranging from zero to three subject to the limitation that x+y+z=3, and the subscript w is zero or a positive number whereby the degree of polymerization indicated by w results in a linear siloxane having a viscosity ranging from 1 to 5,000 cST, preferably from 10 to 300 cSt, more preferably from 15 to 250 cSt, and most preferably from 20 to 150 cSt Also contemplated are the use of such catalytic compositions for polycondensation of low molecular weight organopolysiloxanediols having an average degree of substitution of from 1.8 to 2.2 organic groups attached to silicon per silicon atom; and the use of such compositions for the polycondensation of low molecular siloxanediols having an average degree of substitution of from 1.8 to 2.2 organic groups attached to silicon per silicon atom in the presence of oligomeric organosiloxanols as a chain stopper; and the use of such catalytic compositions for the polycondensation and redistribution of organopolysiloxanediols having an average degree of substitution of from 1.8 to 2.2 organic groups attached to silicon per silicon atom in the presence of low molecular weight triorganosiloxy-terminated organosiloxanes as chain stoppers; as well as the use of such catalytic compositions for the redistribution of triorganosiloxy-terminated organopolysiloxanes having an average degree of substitution of from 1.8 to 2.2 organic groups attached to silicon per silicon atom in the presence of low molecular weight triorganosiloxy-terminated organosiloxanes to produce lower viscosity triorganosiloxy-terminated oils.

Preferred embodiments of the processes of the invention include the step of deactivating the catalyst by heating the final product at temperature above 170° C., preferably at 200° C.; or deactivating the catalyst by treating the final product with basic nitrogen compounds like ammonia, amines, organosilazanes; or deactivating the catalyst by treating the final product with strong basic compounds like metal oxides, metal hydroxides, metal carbonates where the metal is selected from the mono, di- and trivalent metals like lithium, sodium, magnesium, calcium, barium, zinc and aluminum, organometallic compounds, such as butyl lithium, lithium bis(trimethylsilyl)amide, mixtures of any of them, or the like.

DETAILED DESCRIPTION OF THE INVENTION

A reaction mixture of linear siloxane polymers with short chain linear phosphazenes having the formula:

$$X_{3-p}(HO)_pP(NPX_2)_mNP(O)X_2, \quad (I)$$

where X is a halogen selected from the group consisting of F, Cl, Br, and I, and m an integer ranging from 0 to 6 and p is 0 or 1 provides a catalyst for the polymerization of organosiloxanes.

The phosphazenes of this invention are linear low polymers, i.e., oligomers of the general formulae set forth above, and the derivatives mentioned above. Although the halogen X can be chloro, bromo, iodo, fluoro, and the like, it is preferred, that the halogen X is a chlorine atom. Phosphazenes with a value for m which is higher than 8 are less suitable as catalysts. Most preferred are the phosphazenes in which the value of m is from 0 to 3. It is sometimes difficult to separate the oligomeric phosphazenes having different m values and mixtures are often used.

The siloxanes that form the catalytically active mixture upon reaction with the short chain linear phosphazenes are defined by the formula:

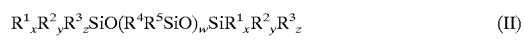
$$R^1{}_xR^2{}_yR^3{}_zSiO(R^4R^5SiO)_wSiR^1{}_xR^2{}_yR^3{}_z \quad (II)$$

where $R^1$, $R^2$, $R^3$, $R^4$, and $R^5$ are each independently selected from the group consisting of hydrogen and one to forty carbon atom monovalent hydrocarbon radicals, the subscripts x, y, and z are numbers ranging from zero to three subject to the limitation that x+y+z=3, and the subscript w is zero or a positive number whereby the degree of polymerization indicated by w results in a linear siloxane having a viscosity ranging from 1 to 5,000 cST, preferably from 10 to 300 cSt, more preferably from 15 to 250 cSt, and most preferably from 20 to 150 cSt Applicants note that one to forty carbon atom monovalent hydrocarbon radicals include alkenyl radicals, alkynyl radicals, alkylaryl radicals and aryl radicals. Generally $R^4$ and $R^5$ will be identical and are selected from the group consisting of alkyl, aryl, and alkylaryl radicals. A preferred group for $R^1$ is the group consisting of H, $CH_3$, $CH=CH_2$, one to forty carbon alkyl groups, one to forty carbon alkoxy groups, one to forty carbon aryloxy groups, and six to forty carbon atom aryl groups.

The invention accordingly also provides for the use of linear phosphazene catalysts, as defined above, in the process of polymerizing organosiloxanes. They are particularly useful as condensation catalysts but are also suitable as redistribution catalysts. Thus they will be useful for a process of making organopolysiloxanes having units of the general formula (III):

$$R^6_a SiO_{(4-a)/2} \qquad (III)$$

wherein $R^6$ denotes a hydrogen atom, a hydrocarbon group having from 1 to 18 carbon atoms, a substituted hydrocarbon group having from 1 to 18 carbon atoms and a has on average a value of from 1.8 to 2.2. $R^6$ substituents may be alkyl, e.g. methyl, ethyl, propyl, isobutyl, hexyl, dodecyl or octadecyl, alkenyl, e.g. vinyl, allyl, butenyl, hexenyl or decenyl, alkynyl, e.g. propargyl, aryl, e.g. phenyl, aralkyl, e.g. benzyl, alkaryl, e.g. tolyl or xylyl, substituted groups, e.g. trifluoropropyl, chloropropyl or chlorophenyl. Preferably at least 80% of all $R^6$ groups are alkyl or aryl groups, more preferably methyl groups. Most preferably substantially all $R^6$ groups are alkyl or aryl groups, especially methyl groups. The organopolysiloxanes are preferably those in which the value of a is 2 in formula (II) for practically all units, except for the endblocking units (a would be 1), and the siloxanes are substantially linear polymers of the general formula (IV):

$$R^7(R^6_2 SiO)_r SiR^6_2 R^7 \qquad (IV)$$

wherein $R^6$ is as defined above, $R^7$ is selected from the group consisting of $R^6$, alkoxy, aryloxy and hydroxyl and r is a positive integer.

When $R^7$ is hydroxyl the process of the present invention provides for a polymerization, condensation or polycondensation reaction. If two or more compounds of formula (IV) are used in the process of the present invention, each having a different degree of polymerization, r, where $R^7$ is $R^6$, alkoxy, and aryloxy, the process of the present invention provides for a redistribution reaction. By redistribution reaction, Applicants define an equilibration process where two or more siloxanes of formula (IV) and of differing degrees of polymerization, r, are reacted in the presence of a catalyst of the present invention to form a siloxane or mixture of siloxanes having a degree of polymerization different from any of the component starting siloxanes. The degree of polymerization, r, is an average value.

It is, however, also possible that small amounts of units wherein the value of "a" in (M) denotes 0 or 1 are present Polymers with such units in the chain would have a small amount of branching present. Preferably $R^7$ denotes a hydroxyl group or an alkyl or aryl group, e.g. methyl or phenyl. The viscosity of the organopolysiloxanes which may be produced by the process using a catalyst according to the present invention may be in the range of from 2 to many millions mm²/s, depending on the reaction conditions and raw materials used in the method of the invention. Suitable organosiloxanes for use as reagents in a polymerization process in which the catalysts of the invention are used include polydiorganosiloxanes having terminal hydroxydiorganosiloxane units, e.g. hydroxyldimethylsiloxane endblocked polydimethylsiloxanes, hydroxyldimethylsiloxane endblocked polydimethyl polymethylphenyl siloxane copolymers, trioganosiloxane endblocked polydimethylsiloxanes, e.g. trimethylsiloxane endblocked polydimethylsiloxanes.

The catalysts of the invention may be used at a concentration of from 1 to 1000 ppm by weight linear phosphazenes based on the total weight of the organosiloxanes used as reagents in a polymerization process. Preferably from 5 to 150 ppm by weight are used, most preferably from 5 to 50 ppm. The amount of catalyst used in the method of the invention may be reduced when the temperature at which the organosilicon compounds and the catalyst are contacted is increased. The method of the invention may conveniently be carried out at room temperature. The temperature may also be as high as 160° C., or as low as 0C. Preferably, however, the temperature range is from 20° to 160° C., most preferably from 500 to 120° C. It is preferred to operate under vacuum to drive the condensation reaction to completion by removal of product water. Applicants define vacuum to mean below atmospheric pressure. Preferred ranges of the vacuum conditions are about 0.1 to about 700 mm Hg, preferably about 0.1 to about 350 mm Hg, more preferably about 0.1 to about 100 mm Hg, and most preferably about 0.1 to about 50 mm Hg. In contrast the redistribution reaction may be run at a wide variety of pressures from below atmospheric to slightly above atmospheric. Thus while the appended claims may recite a limit of 760 mm Hg, this being atmospheric pressure, Applicants intend that pressures up to about 2 atmospheres (1,520 mm Hg) are included.

Catalysts according to the invention may be neutralized at the end of the polymerization reaction in order to stabilize the reaction product, e.g. in respect of its viscosity. The neutralization may be done at any state of the polymerization process, e.g. as soon as the desired viscosity of the organopolysiloxanes is reached. Neutralization agents for the catalysts are alkaline materials, preferably mildly alkaline materials. Examples of suitable neutralization agents are diethylamine, propylamine, ammonia and hexamethyldisilazane.

The new chemical composition described above was tested as a catalyst for polycondensation and redistribution of organosiloxanes, as will be set forth in the detailed examples which follow. The catalytic activity of these new catalysts are comparable to LPNC. The high molecular weight product of polycondensation of low molecular weight siloxanediols does not contain increased contents of oligomeric cyclic species. Interestingly, the catalyst is active in the temperature range from 0° C. to 160° C. Above 160° C. the activity of these particular catalysts dramatically decreases. At 200° C. this new catalyst is inactive. This behavior allows for a deactivation of the catalysts in the final product by heating to 200° C. for short periods of time. A silicone high molecular weight gum prepared using the new catalyst at 120° C. and then heated at 200° C. for 5 minutes exhibits high thermal stability.

All United States patents referenced herein are herewith and hereby specifically incorporated by reference.

EXPERIMENTAL

EXAMPLE 1

Preparation of $OCl_2PNPCl_3$

A 100 mL flask was charged with 20.8 g (0.1 mole) of phosphorus pentachloride, $PCl_5$, 2.93 g of ammonium sulfate and 50 mL of 1, 1, 2, 2-tetrachloroethane. The mixture was stirred at reflux for one hour. At completion of the reaction, the product was purified by removing the solvent and vacuum distilled at 0.1 mm Hg at 110–115° C. The yield of $OCl_2PNPCl_3$, as light yellow crystals was 20 g.

EXAMPLE 2

Preparation of $OCl_2PNPCl_2NPCl_3$

A 100 mL flask was charged with 13.5 g (0.05 mole) of $OCl_2PNPCl_3$, 11.6 mL of $HN(Si(CH_3)_3)_2$ and 20 mL of dichloromethane. The reaction mixture was stirred at reflux for twelve hours. At the completion of the reaction, 10.3 g of phosphorus pentachloride, $PCl_5$, was added and the mixture allowed to reflux an additional twelve hours. The solvent was removed under reduced pressure by roto-evaporation and the product purified by vacuum distillation at 0.1 mm Hg at 170–175° C.

EXAMPLE 3

Preparation of a Catalytic Mixture in a Trimethylsiloxy Stopped Silicone Fluid

A 250 mL flask was charged with 100 g of a trimethylsiloxy stopped polydimethylsiloxane oil having a viscosity of 100 centistokes and 2.0 g of $OCl_2PNPCl_3$. The resulting mixture consisted of two phases and was vigorously stirred under nitrogen for eight hours at 100° C. When a clear homogeneous mixture formed, the volatile materials were removed by vacuum distillation at 0.05 mm Hg at 90° C. leaving 97 g of a clear high boiling siloxane oil. This product is identified as catalyst mixture I.

EXAMPLE 4

Preparation of a Catalytic Mixture in a Vinyldimethylsiloxy Stopped Silicone Fluid A 250 mL flask was charged with 100 g of a vinyldimethylsiloxy stopped polydimethylsiloxane oil having a viscosity of 100 centistokes and 2.0 g of $OCl_2PNPCl_3$. The resulting mixture consisted of two phases and was vigorously stirred under nitrogen for eight hours at 100° C. When a clear homogeneous mixture formed, the volatile materials were removed by vacuum distillation at 0.05 mm Hg at 90° C. leaving 96 g of a clear high boiling siloxane oil. This product is identified as catalyst mixture IL

EXAMPLE 5

Polycondensation and Rearrangement of a Silanol Terminated Polydimethylsiloxane in the Presence of Catalytic Mixture I A 250 mL flask was equipped with a mechanical stirrer, condenser, and a vacuum outlet and was charged with 60 g of silanol terminated polydimethylsiloxane and 1 g of decamethyltetrasiloxane. The reaction mixture was heated to 100° C. After reaching the reaction temperature 60 μL of catalyst mixture I (20 ppm) was added. The reaction mixture was stirred at temperature under a vacuum of 1 mm Hg. A very fast polycondensation reaction was observed followed by a significant decrease in viscosity. After 5 minutes of reaction, the reaction was terminated by quenching with hexamethyldisilazane. The resulting product, a trimethylsiloxy stopped oil contained less than 50 ppm of silanol end groups.

EXAMPLE 6

Polycondensation and Rearrangement of a Silanol Terminated Polydimethylsiloxane in the Presence of Catalytic Mixture II A 250 mL flask was equipped with a mechanical stirrer, condenser, and a vacuum outlet and was charged with 60 g of silanol terminated polydimethylsiloxane and 1 g of decamethyltetrasiloxane. The reaction mixture was heated to 100° C. After reaching the reaction temperature 60 μL of catalyst mixture II (20 ppm) was added. The reaction mixture was stirred at temperature under a vacuum of 1 mm Hg. A very fast polycondensation reaction was observed followed by a significant decrease in viscosity. After 5 minutes of reaction, the reaction was terminated by quenching with hexamethyldisilazane. The resulting product, a trimethylsiloxy stopped oil contained less than 50 ppm of silanol end groups.

EXAMPLE 7

Preparation of a Catalytic Mixture in a Trimethylsiloxy Stopped Fluid

A 100 mL round bottom flask was charged with 50.0 g of trimethylsiloxy stopped polydimethylsiloxane fluid having a viscosity of 20 centistokes and 1.0 g of $OCl_2PNPCl_3$. The solid/liquid mixture was heated under nitrogen with stirring. At 81° C. the mixture appeared clear. The solution was heated an additional 45 minutes at 90° C. Upon cooling, the mixture became cloudy. This mixture is identified as catalyst mixture III.

EXAMPLE 8

Rearrangement of a 1,000 Centistoke Trimethylsiloxy Stopped Polydimethylsiloxane Fluid in the Presence of Catalytic Mixture III A 250 mL flask was equipped with a mechanical stirrer, condenser, and a nitrogen inlet and was charged with 100.0 g of a 1,000 centistoke (cSt) trimethylsiloxy stopped polydimethylsiloxane fluid, 2.0 g hexamethyldisiloxane, and 75 μL of catalytic mixture (solution) III (15 ppm). The reaction mixture was heated in a 90° C. oil bath and samples taken at 15, 30, and 60 minutes after catalyst addition. Ostwald viscosity at 25° C. and percent volatiles (2 g of sample in 150° C. convection oven) were measured, demonstrating complete rearrangement in less than thirty minutes reaction time.

| Sample Time (min.) | Viscosity (cSt) | Volatiles, wt. % |
| --- | --- | --- |
| 15 | 199 | 1.8 |
| 30 | 179 | 1.7 |
| 60 | 175 | 1.8 |

EXAMPLE 9

Rearrangement of a 1,000 Centistoke Trimethylsiloxy Stopped Polydimethylsiloxane Fluid in the Presence of a Linear Phosphonitrilic Chloride Catalyst Solution The same reaction was run as in example 8 with the exception of substituting 75 μL of a catalyst solution consisting of 2 weight percent linear phosphonitrilic chloride, $Cl_3PNPCl_2NPCl_3PCl_6$, in a 20 centistoke trimethylsiloxy stopped polydimethylsiloxane fluid. The results are similar to those obtained in example 8.

| Sample Time (min.) | Viscosity (cSt) | Volatiles, wt. % |
| --- | --- | --- |
| 15 | 196 | 1.8 |
| 30 | 160 | 1.8 |
| 60 | 155 | 2.0 |

EXAMPLE 10

Polycondensation and Rearrangement of a Stripped Hydrolyzate in the Presence of Catalytic Mixture III A 500 mL round bottom flask equipped with a mechanical stirrer, condenser and a vacuum outlet was charged with 100.0 g of linear low molecular weight polydimethylsiloxane diol having a viscosity of 100 centistokes, a silanol content of 1.3 weight percent silanol, and a volatiles content of about 2 weight percent and 75 μL of catalyst mixture (solution) III (15 ppm). The flask was placed in a 90° C. oil bath and heated under a vacuum of 1–2 mm Hg with stirring. Within four minutes of the beginning of the reaction, a significant increase in viscosity was observed producing an unstirrable soft gum, indicative of polycondensation.

The vacuum was removed by bleeding in nitrogen and an additional 75 μL of catalyst mixture (solution) m was added along with 2.0 g of hexamethyldisiloxane. After five minutes of reaction, the mixture became stirrable, indicative of rearrangement Samples were taken at 30 and 60 minutes and tested for viscosity and volatiles.

| Sample Time (min.) | Viscosity (cSt) | Volatiles, wt. % |
| --- | --- | --- |
| 30 | 239 | 3.9 |
| 60 | 244 | 4.4 |

Having described the invention that which is claimed is:

1. A catalytic composition comprising:
   1) a short chain linear phosphazene having the formula:

   $X_{3-p}(HO)_pP(NPX_2)_mNP(O)X_2$, where X is a halogen selected from the group consisting of F, Cl, Br, and I, and m is an integer ranging from 0 to 6 and p is 0 or 1; and
   2) a linear siloxane having a viscosity ranging from 1 to 5,000 centistokes.
2. The composition of claim 1 wherein p is zero.
3. The composition of claim 2 wherein X is chloride.
4. The composition of claim 3 wherein m is one.
5. The composition of claim 4 wherein the linear siloxane is selected from the group of compounds having the formula:

   $R^1_xR^2_yR^3_zSiO(R^4R^5SiO)_wSiR^1_xR^2_yR^3_z$ where $R^1$, $R^2$, $R^3$, $R^4$, and $R^5$ are each independently selected from the group consisting of one to forty carbon atom monovalent hydrocarbon radicals the subscripts x, y, and z are numbers ranging from zero to three subject to the limitation that x+y+z=3, and the subscript w is zero or a positive number.
6. The composition of claim 5 wherein $R^1$ is selected from the group consisting of H, $CH_3$, $CH=CH_2$, one to forty carbon alkyl groups, one to forty carbon alkoxy groups, one to forty carbon aryloxy groups, and six to forty carbon atom aryl groups, wherein $R^2$, $R^3$, $R^4$, and $R^5$ are methyl.
7. A catalytic composition comprising the reaction product of:
   1) a short chain linear phosphazene having the formula:

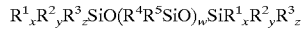
   $X_{3-p}(HO)_pP(NPX_2)_mNP(O)X_2$, where X is a halogen selected from the group consisting of F, Cl, Br, and I, and m is an integer ranging from 0 to 6 and p is 0 or 1; and
   2) a linear siloxane having a viscosity ranging from 1 to 5,000 centistokes.
8. The composition of claim 7 wherein p is zero.
9. The composition of claim 8 wherein X is chloride.
10. The composition of claim 9 wherein m is one.
11. The composition of claim 10 wherein the linear siloxane is selected from the group of compounds having the formula:

    $R^1_xR^2_yR^3_zSiO(R^4R^5SiO)_wSiR^1_xR^2_yR^3_z$ where $R^1$, $R^2$, $R^3$, $R^4$, and $R^5$ are each independently selected from the group consisting of one to forty carbon atom monovalent hydrocarbon radicals the subscripts x, y, and z are numbers ranging from zero to three subject to the limitation that x+y+z=3, and the subscript w is zero or a positive number.
12. The composition of claim 11 wherein $R^1$ is selected from the group consisting of H, $CH_3$, $CH=CH_2$, one to forty carbon alkyl groups, one to forty carbon alkoxy groups, one to forty carbon aryloxy groups, and six to forty carbon atom aryl groups, wherein $R^2$, $R^3$, $R^4$, and $R^5$ are methyl.
13. A catalytic composition consisting essentially of:
    1) a short chain linear phosphazene having the formula:

    $X_{3-p}(HO)_pP(NPX2)_mNP(O)X_2$, where X is a halogen selected from the group consisting of F, Cl, Br, and I, and m is an integer ranging from 0 to 6 and p is 0 or 1; and
    2) a linear siloxane having a viscosity ranging from 1 to 5,000 centistokes.
14. A process for making a catalytic mixture comprising:
    1) preparing a short chain linear phosphazene compound having the formula:

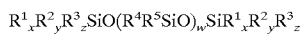
    $X_{3-p}(HO)_pP(NPX_2)_mNP(O)X_2$, where X is a halogen selected from the group consisting of F, Cl, Br, and I, and m is an integer ranging from 0 to 6 and p is 0 or 1; and
    2) contacting said short chain linear phosphazene with a linear siloxane having a viscosity ranging from 1 to 5,000 centistokes.
15. The process of claim 14 wherein p is zero.
16. The process of claim 15 wherein X is chloride.
17. The process of claim 16 wherein m is zero or one.
18. The process of claim 17 wherein the linear siloxane is selected from the group of compounds having the formula:

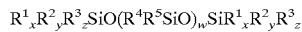
    $R^1_xR^2_yR^3_zSiO(R^4R^5SiO)_wSiR^1_xR^2_yR^3_z$ where $R^1$, $R^2$, $R^3$, $R^4$, and $R^5$ are each independently selected from the group consisting of one to forty carbon atom monovalent hydrocarbon radicals the subscripts x, y, and z are numbers ranging from zero to three subject to the limitation that x+y+z=3, and the subscript w is zero or a positive number.

19. The process of claim 18 wherein $R^1$ is selected from the group consisting of H, $CH_3$, $CH=CH_2$, one to forty carbon aryloxy groups, one to forty carbon alkoxy groups, one to forty carbon aryloxy groups, and six to forty carbon atom aryl groups, wherein $R^2$, $R^3$, $R^4$, and $R^5$ are methyl.

20. A process wherein a catalytic mixture comprising:
   1) a short chain linear phosphazene having the formula:

   $X_{3-p}(HO)_pP(NPX_2)_mNP(O)X_2,$ where X is a halogen selected from the group consisting of F, Cl, Br, and I, and m is an integer ranging from 0 to 6 and p is 0 or 1; and
   2) a first linear siloxane having a viscosity ranging from 1 to 5,000 centistokes or the reaction product thereof;
   (A) contacting said catalytic mixture with two or more second siloxanes having the formula:

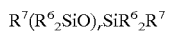
   $R^7(R^6_2SiO)_rSiR^6_2R^7$ wherein $R^6$ is selected from the group consisting of hydrogen and 1 to 18 carbon atom hydrocarbon radicals and $R^7$ is selected from the group consisting of $R^6$, alkoxy, and aryloxy, where r is different for each siloxane, at a temperature ranging from about 0 to about 160° C. under a pressure ranging from about 0.1 to about 760 mm Hg and
   (B) deactivating said catalytic mixture by
      1) heating to a temperature above 170° C.;
      2) neutralizing said catalytic mixture with basic nitrogen compounds selected from the group consisting of ammonia, amines and organosilazanes;
      3) neutralizing said catalytic mixture with a metal oxide, a metal hydroxide or a metal carbonate selected from the group consisting of lithium, sodium, magnesium, calcium, barium, zinc and aluminum; or
      4) neutralizing said catalytic mixture with a compound selected from the group consisting of butyl lithium, bis(trimethylsilyl)amide and mixtures thereof; whereby said second siloxanes undergo redistribution.

21. A process wherein a catalytic mixture comprising:
   1) a short chain linear phosphazene having the formula:

   $X_{x-p}(HO)_pP(NPX_2)_mNP(O)X_2,$ where X is a halogen selected from the group consisting of F, Cl, Br, and I, and m is an integer ranging from 0 to 6 and p is 0 or 1; and
   2) a first linear siloxane having a viscosity ranging from 1 to 5,000 centistokes or the reaction product thereof;
   (A) contacting said catalytic mixture with a second siloxane having the formula:

   $R^7(R^6_2SiO)_rSiR^6_2R^7$ wherein $R^6$ is selected from the group consisting of hydrogen and 1 to 18 carbon atom hydrocarbon radicals and $R^7$ is hydroxyl, at a temperature ranging from about 0 to about 160° C. under a pressure ranging from about 0.1 about 760 mm Hg and
   (B) deactivating said catalytic mixture by
      1) heating to a temperature above 170° C.;
      2) neutralizing said catalytic mixture with basic nitrogen compounds selected from the group consisting of ammonia, amines and organosilazanes;
      3) neutralizing said catalytic mixture with a metal oxide, a metal hydroxide or a metal carbonate selected from the group consisting of lithium, sodium, magnesium, calcium, barium, zinc and aluminum; or
      4) neutralizing said catalytic mixture with a compound selected from the group consisting of butyl lithium, bis(trimethylsilyl)amide and mixtures thereof; whereby said second siloxane undergoes polymerization, condensation or polycondensation.

* * * * *